(12) United States Patent
Dickey

(10) Patent No.: US 8,358,371 B1
(45) Date of Patent: Jan. 22, 2013

(54) CRANE BLOCK CAMERA SYSTEM

(76) Inventor: Keith Dickey, Lone Jack, MO (US)

(*) Notice: Subject to any disclaimer, the term of this patent is extended or adjusted under 35 U.S.C. 154(b) by 364 days.

(21) Appl. No.: 12/713,506

(22) Filed: Feb. 26, 2010

(51) Int. Cl.
*H04N 5/225* (2006.01)

(52) U.S. Cl. ..... 348/372; 348/373; 348/143; 348/211.2; 348/211.11

(58) Field of Classification Search .............. 348/372, 348/373, 143, 144, 211.2, 211.11; 212/96, 212/104, 105
See application file for complete search history.

(56) References Cited

U.S. PATENT DOCUMENTS

| | | | |
|---|---|---|---|
| 5,392,935 A | 2/1995 | Kazama et al. | |
| 6,140,930 A | 10/2000 | Shaw | |
| 6,549,139 B2 | 4/2003 | Shaw, Jr. | |
| 6,744,372 B1 | 6/2004 | Shaw et al. | |
| 6,985,085 B1 | 1/2006 | Brown | |
| D582,460 S | 12/2008 | Yoo et al. | |
| 2004/0057718 A1* | 3/2004 | Chapman | 396/428 |
| 2007/0235404 A1* | 10/2007 | Catanzaro | 212/312 |
| 2009/0191913 A1* | 7/2009 | Jones | 455/557 |

* cited by examiner

*Primary Examiner* — Yogesh Aggarwal
(74) *Attorney, Agent, or Firm* — Kyle Fletcher

(57) ABSTRACT

The crane block camera system attaches onto a crane block in order to provide video footage of the area around the crane block. The system attaches onto the crane block and includes electrical generating means thereon. The video footage is transmitted wirelessly where it is received by a receiver and monitor located near the crane operator.

10 Claims, 4 Drawing Sheets

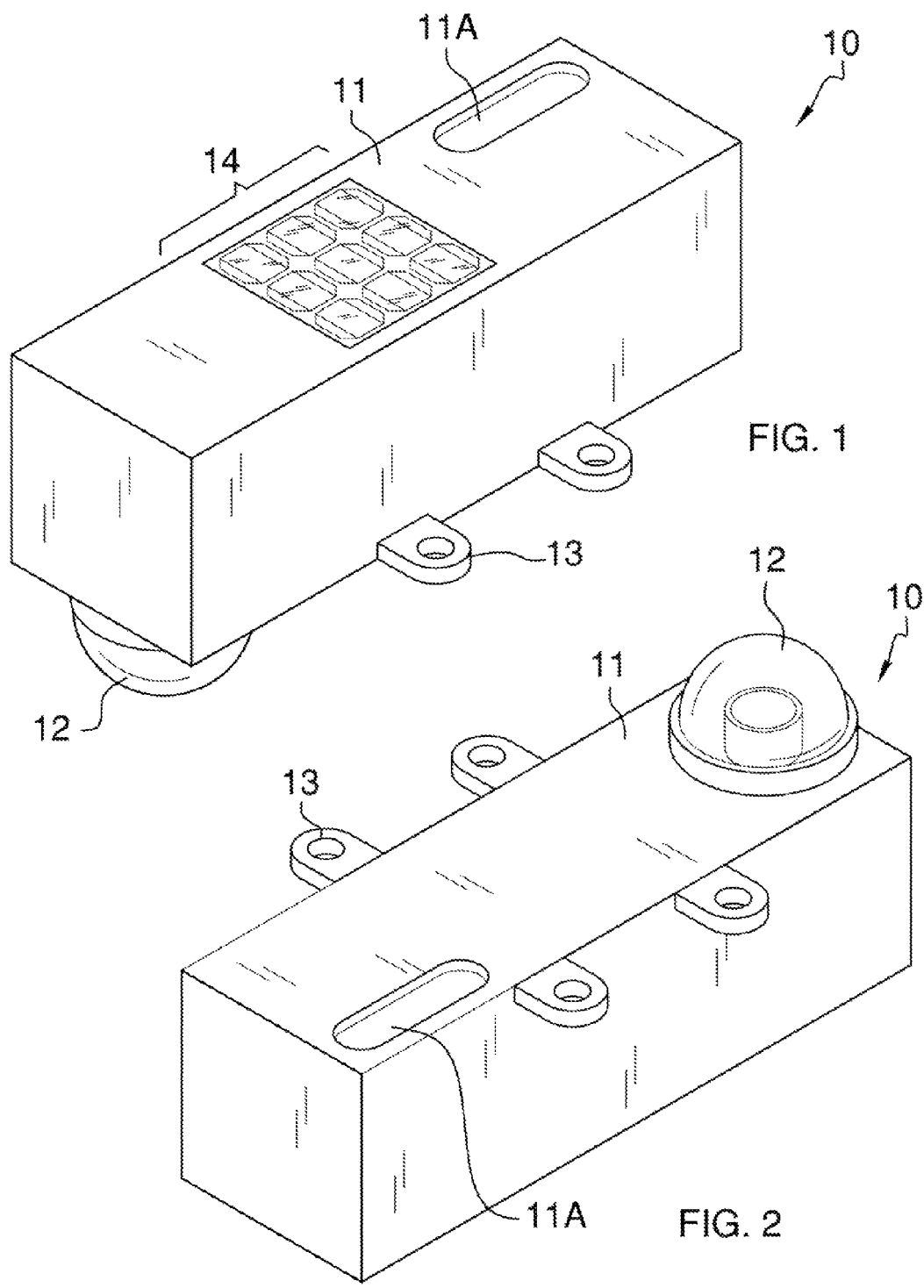

CRANE BLOCK CAMERA SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of video monitoring systems, more specifically, a video monitoring system that mounts onto a crane block and of which includes electrical generating means.

B. Discussion of the Prior Art

As a preliminary note, it should be stated that there is an ample amount of prior art that deals with cameras and cranes. As will be discussed immediately below, no prior art discloses a camera system that mounts atop a crane block and of which enables a crane operator to visualize surroundings at the height of the crane block and of which includes electrical generating means integrated into the camera system.

The Shaw patent (U.S. Pat. No. 6,140,930) discloses a safety system for a crane that includes a camera device. However, the safety system does not involve a camera system that wirelessly transmits video signals, and of which includes electrical generating means therein.

The Catanzaro Patent Application Publication (U.S. Pub. No. 2007/0235404) discloses a crane camera system that employs a hook camera transmitter to send wireless signals vertically upward to a trolley receiver. However, the crane camera system does not include electrical-generating means thereon.

The Shaw et al. patent (U.S. Pat. No. 6,744,372) discloses a crane warning system that includes a camera located at the hook member of the crane. Again, the safety system does not involve a camera system that wirelessly transmits video signals, and of which includes electrical generating means therein.

The Shaw, Jr. patent (U.S. Pat. No. 6,549,139) discloses a crane warning system that includes a camera integrated into the ball of the crane. However, the crane warning system does not involve a camera system that wirelessly transmits video signals, and of which includes electrical generating means therein.

The Brown patent (U.S. Pat. No. 6,985,085) discloses a crane safety system providing a view of the operation of the crane to the crane operator in which the safety system includes a camera and monitor. However, the crane safety system does not incorporate electrical generating means for supplying electricity to a remote video camera system that wirelessly transmits the video signal generated by the video camera.

The Kazama et al. patent (U.S. Pat. No. 5,392,935) discloses a control system for a cable crane. However, the cable crane system does not teach a video camera system incorporating an electrical generating means for supplying electricity to a remote video camera system that wirelessly transmits the video signal generated by the video camera.

While the above-described devices fulfill their respective and particular objects and requirements, they do not describe a camera system that mounts atop a crane block and of which enables a crane operator to visualize surroundings at the height of the crane block and of which includes electrical generating means integrated into the camera system. In this regard, the crane block camera system departs from the conventional concepts and designs of the prior art.

SUMMARY OF THE INVENTION

The crane block camera system attaches onto a crane block in order to provide video footage of the area around the crane block. The system attaches onto the crane block and includes electrical generating means thereon. The video footage is transmitted wirelessly where it is received by a receiver and monitor located near the crane operator.

It is an object of the invention to provide a wireless video camera system for use with a crane block.

A further object of the invention is to provide a camera system that can generate electricity so as to alleviate the need to run electrical wiring to power the camera system.

A further object of the invention is to provide a wireless transmitter that sends the video signal out to a remote receiver.

A further object of the invention is to provide an electrical generating means that comprises an array of solar cells and/or a flywheel that rotates via the crane's cable.

These together with additional objects, features and advantages of the expandable crane block camera system will be readily apparent to those of ordinary skill in the art upon reading the following detailed description of presently preferred, but nonetheless illustrative, embodiments of the crane block camera system when taken in conjunction with the accompanying drawings.

In this respect, before explaining the current embodiments of the expandable crane block camera system in detail, it is to be understood that the crane block camera system is not limited in its applications to the details of construction and arrangements of the components set forth in the following description or illustration. Those skilled in the art will appreciate that the concept of this disclosure may be readily utilized as a basis for the design of other structures, methods, systems for carrying out the several purposes of the crane block camera system.

It is therefore important that the claims be regarded as including such equivalent construction insofar as they do not depart, from the spirit and scope of the crane block camera system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a top isometric view of the crane block camera system by itself, and detailing the solar panels along a top surface;

FIG. 2 illustrates a bottom, isometric view of the crane block camera system and detailing the video camera and the slot for introduction of the cable;

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 3:
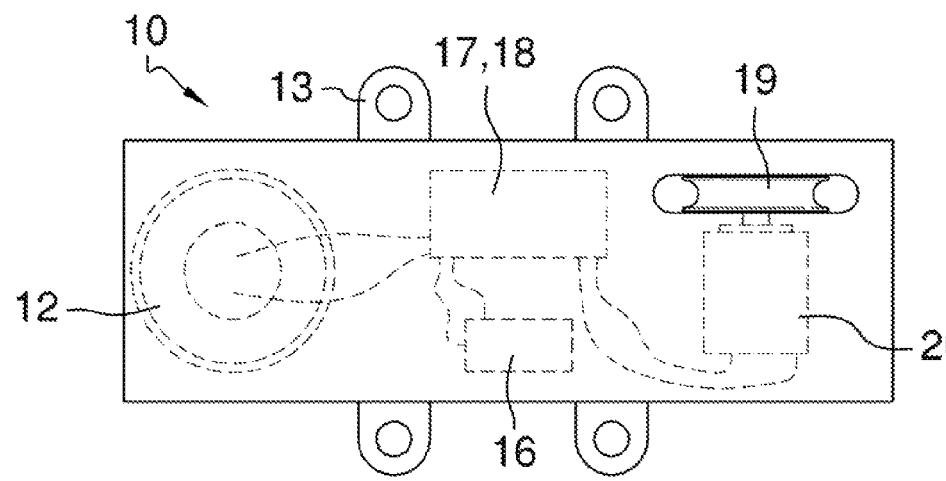
FIG. 3 illustrates a top view of the crane block camera system with hidden lines depicting the battery system; the generator, the flywheel, the transmitter, and the camera.
Figure 4:
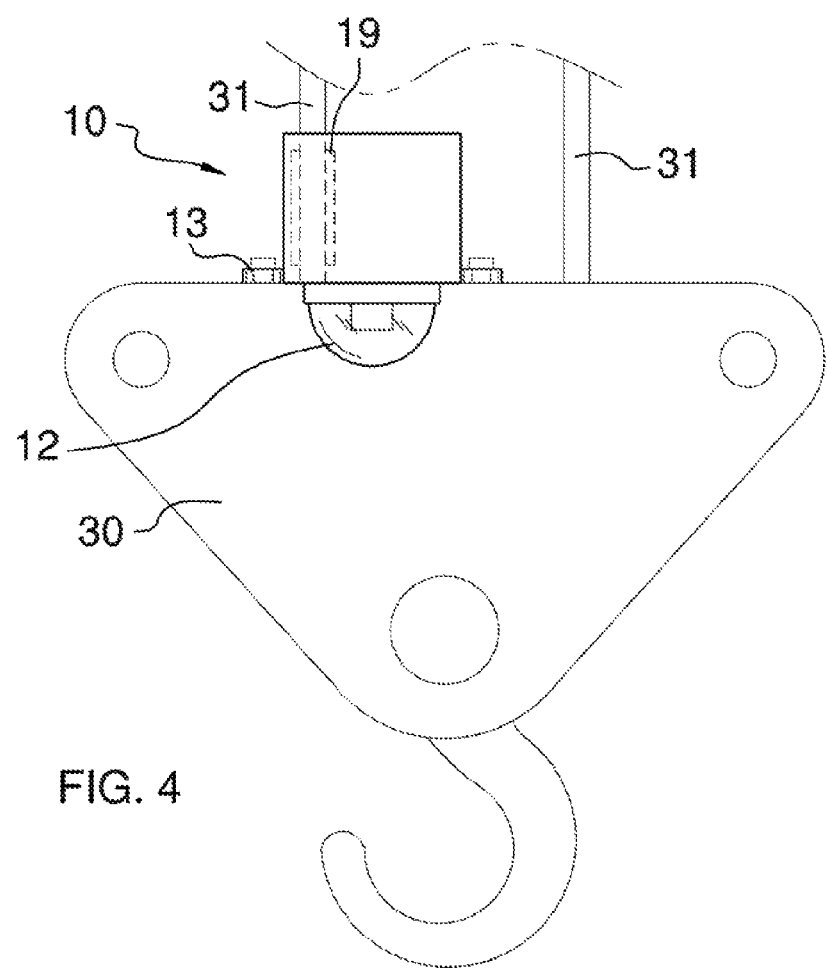
FIG. 4 illustrates a side view of the crane block camera system mounted onto a crane block and depicting the cable entering across both slots and the flywheel.
Figure 5:
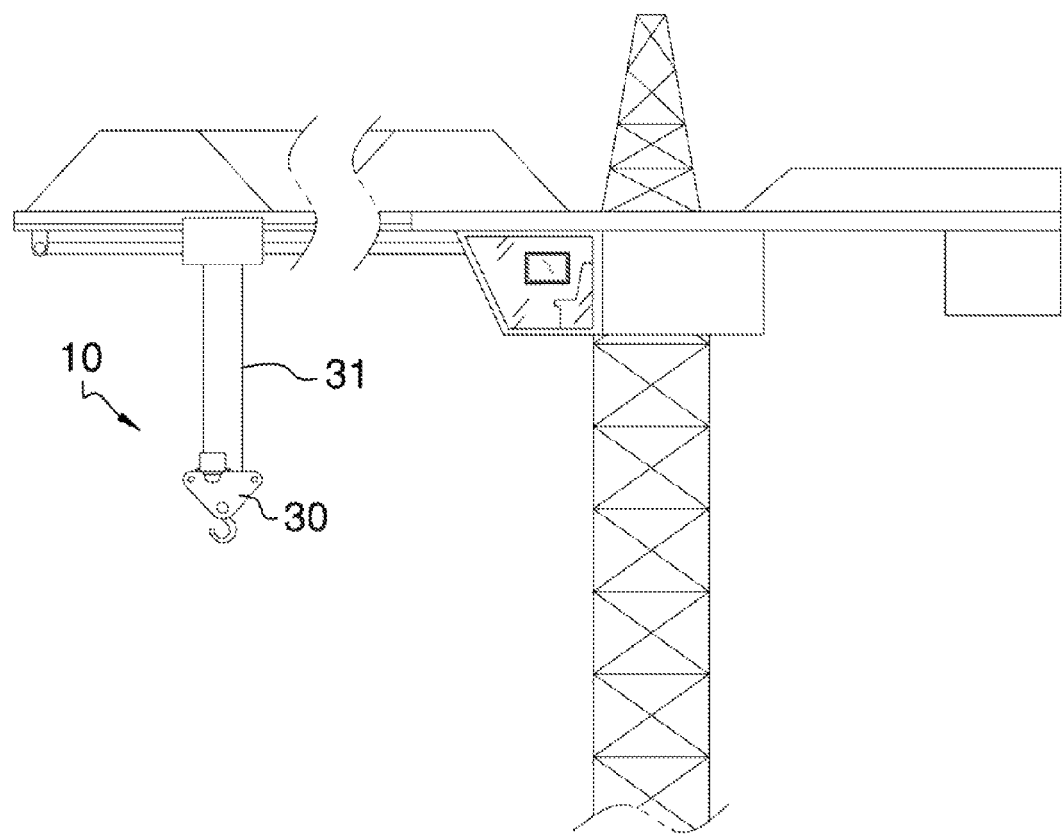
FIG. 5 illustrates a view of the crane block camera system installed upon a crane block.
Figure 6:
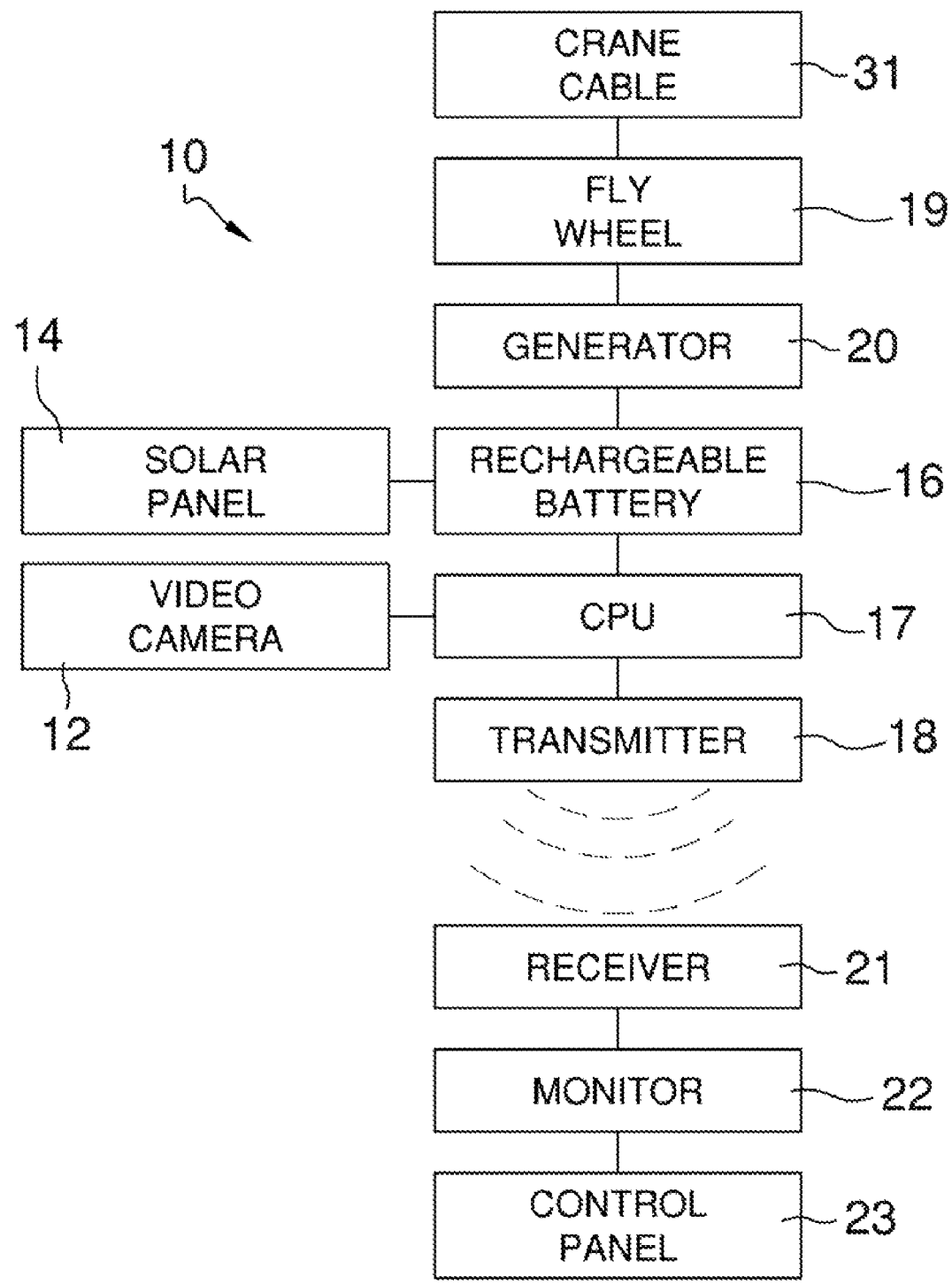
FIG. 6. Illustrates a diagram of the various components of the crane block camera system.

Detailed reference will now be made to the preferred embodiment of the present invention, examples of which are illustrated in FIGS. 1-6. A crane block camera system 10 (hereinafter invention) includes a housing 11 and a camera 12.

The housing 11 includes all of the necessary components of the invention 10. The housing 11 is made of a durable material comprising a metal, plastic, carbon fiber composite, or wood.

Located on the housing 11 are attaching means 13. The attaching means 13 are responsible for securing the invention 10 to a crane block 30. However, it shall be noted that the invention 10 may be attached to other areas of a crane or trolley, or other assemblies that are raised or lowered from said crane or trolley.

The attaching means 13 consist of a plurality of mounting holes from which a fastening means may be utilized to secure the invention 10 to the crane block 30. The fastening means comprises bolts, screws, nails, or rivets. However, it shall be noted that the attaching means 13 may be welded or glued to the crane block 30.

The camera 12 extends from a bottom surface of the housing 11 to record video footage from a particular vantage with respect to the crane block. The housing 11 is installed upon the crane block 30 such that a portion of the housing 11 extends out over a side of the crane block 30. The portion of the housing 11 extending over the side of the crane block is where the camera 12 is positioned to enable viewing from a vantage point that shows the center of the crane block 30 relative to the surroundings. However, it shall be noted that the camera 12 may have a telescoping head that enables the camera to rotate in order to provide greater angles with which to record video footage. The camera 12 is depicted as being encased within a transparent dome that protects the camera 12 from the elements, while enabling the camera 12 to rotate therein.

The invention 10 includes electrical generating means, which comprise either an array of solar cells 14 or a flywheel 15. Located on a surface of the housing 11 are the solar cells 14. The solar cells 14 provide electrical generating capabilities to the invention 10.

Located within the housing 11 is at least one battery 16, a central processing unit 17 (hereinafter CPU), a transmitter 18, a flywheel 19, and a generator 20. The battery(s) 16 provide electrical power to the camera 12, CPU 17, and the transmitter 18. The battery(s) 16 are preferably rechargeable.

The video camera 12 sends a video signal to the CPU 17, which is transmitted wirelessly via the transmitter 18. A receiver 21 receives the video signal, and displays said video signal on a monitor 22 located near a crane operator.

A control panel 23 enables the invention 10 to be controlled by the crane operator remotely. The control panel 23 primarily enables the invention 10 to be turned on or off remotely, and requires an extra transmitter (not depicted) adjacent the control panel 23 in order to transmit a signal to a receiver (not depicted) that is wired to the CPU 17, which in turn controls the video camera 12 and the CPU 17 itself.

An alternative electrical generating means involves the use of the flywheel 19 and the generator 20, which work in conjunction with a cable 31. The housing 11 has a plurality of slots 11A that enable the cable 31 to enter and exit the housing 11. Located adjacent the slots 11A and within the housing 11 is the flywheel 19. The flywheel 19 rotates as the cable moves about the crane block 30. As the cable 31 moves, the flywheel 19 and the generator 20 rotate, which generates electricity that is transmitted to the battery 16.

It is important to note that for the alternative electrical generating means to operate, the crane block 30 must be of the type that includes a pulley integrated into the design, which rotates with the cable 31.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A crane block camera system comprising:
   a video camera that mounts onto a crane block by attaching means, and of which transmits via a transmitter a video signal wirelessly to a receiver;
   an electrical generating means for producing electricity remotely is included;
   a powering means powers both the transmitter and the video camera;
   wherein the powering means comprises at least one battery, which is rechargeable;
   wherein the electrical generating means comprises at least one solar cell or a flywheel and generator;

wherein the flywheel and generator produce electricity by aligning a crane cable across the flywheel, such that when the crane cable rises up or down with respect to a crane block, the flywheel and generator rotates; and wherein the generator transmits electricity to the battery.

2. The crane block camera system as described in claim 1 wherein the attaching means comprises a plurality of arms that extend outwardly and include mounting holes.

3. The crane block camera system as described in claim 2 wherein the attaching means are secured to the crane block via fastening means comprising bolts, screws, rivets, nails, welding, or gluing.

4. The crane block camera system as described in claim 1 wherein the crane block camera system is enclosed within a housing; and wherein the video camera is mounted on a bottom surface of said housing such that the video camera is directed downward from a top surface of the crane block.

5. The crane block camera system as described in claim 4 wherein the housing is made of a material comprising a metal, plastic, wood, or carbon fiber composite.

6. A crane block camera system comprising:
- a video camera that mounts onto a crane block by attaching means;
- a central processing unit (hereinafter CPU) receives a video signal from the video camera and transmits said video signal via a transmitter to a receiver;
- an electrical generating means for producing electricity remotely is included;
- a powering means powers both the CPU, the transmitter and the video camera;
- wherein the powering means comprises at least one battery, which is rechargeable;
- wherein the electrical generating means comprises at least one solar cell or a flywheel and generator;
- wherein the flywheel and generator produce electricity by aligning a crane cable across the flywheel, such that when the crane cable rises up or down with respect to a crane block, the flywheel and generator rotates; and wherein the generator transmits electricity to the battery;
- wherein the crane block camera system is enclosed within a housing, and includes a plurality of slots that enable the crane cable to enter and exit the housing; and wherein the flywheel is aligned between said slots.

7. The crane block camera system as described in claim 6 wherein the attaching means comprises a plurality of arms that extend outwardly and include mounting holes.

8. The crane block camera system as described in claim 7 wherein the attaching means are secured to the crane block via fastening means comprising bolts, screws, rivets, nails, welding or gluing.

9. The crane block camera system as described in claim 6 wherein the transmitter is wirelessly transmitting the video signal to the receiver, which is wirelessly receiving said signal.

10. The crane block camera system as described in claim 6 wherein the video camera is mounted on a bottom surface of a housing such that the video camera is directed downward from a top surface of the crane block.

* * * * *